(12) United States Patent
Connolly

(10) Patent No.: US 6,827,036 B2
(45) Date of Patent: Dec. 7, 2004

(54) AQUACULTURE

(76) Inventor: Michael Connolly, 2 Ballybride, Rathmichael, County Dublin (IE)

(*) Notice: Subject to any disclaimer, the term of this patent is extended or adjusted under 35 U.S.C. 154(b) by 0 days.

(21) Appl. No.: 10/118,043

(22) Filed: Apr. 9, 2002

(65) Prior Publication Data

US 2002/0108582 A1 Aug. 15, 2002

Related U.S. Application Data

(63) Continuation of application No. PCT/IE00/00122, filed on Oct. 11, 2000.

(30) Foreign Application Priority Data

Oct. 11, 1999 (IE) .................................... 990838
Oct. 11, 1999 (IE) .................................... 990839

(51) Int. Cl.[7] .................................... A01K 61/00
(52) U.S. Cl. .................... 119/208; 119/200; 119/210; 119/223
(58) Field of Search ................. 119/208, 200, 119/207, 209, 210, 214, 223, 215, 228, 226

(56) References Cited

U.S. PATENT DOCUMENTS

| 2,732,663 A | | 1/1956 | Dewey, II ...................... 47/58 |
| 2,984,207 A | * | 5/1961 | Homer ........................ 119/206 |
| 3,036,400 A | * | 5/1962 | Anderson ..................... 43/55 |
| 3,067,712 A | * | 12/1962 | Hans .......................... 114/74 T |
| 3,273,276 A | * | 9/1966 | Sixten .......................... 43/6.5 |
| 3,502,046 A | * | 3/1970 | Stauber ........................ 137/1 |
| 3,709,195 A | | 1/1973 | Tabb ............................ 119/2 |
| 4,169,050 A | | 9/1979 | Serfling et al. ................ 210/12 |
| 4,348,285 A | | 9/1982 | Groeneweg et al. ........ 210/602 |
| 4,394,846 A | | 7/1983 | Roels ............................ 119/2 |
| 5,087,353 A | | 2/1992 | Todd et al. ................... 210/94 |
| 5,216,976 A | | 6/1993 | Marinkovich ................. 119/3 |
| 5,820,759 A | | 10/1998 | Stewart et al. .............. 210/602 |

FOREIGN PATENT DOCUMENTS

| AU | 27690/77 | 2/1979 |
| DE | 4011853 A1 | 10/1991 |
| FR | 2320050 | 3/1977 |
| FR | 2361060 | 3/1978 |
| FR | 2443200 | 7/1980 |
| FR | 2454266 | 11/1980 |
| GB | 15619848 | 3/1980 |

* cited by examiner

Primary Examiner—Yvonne R. Abbott
(74) Attorney, Agent, or Firm—Jacobson Holman PLLC

(57) ABSTRACT

Aquaculture apparatus includes an elongate tube of flexible translucent plastic material which extends longitudinally along level ground. The tube is inflated and air supported. At least the lower section of the tube defines a water course. The tube is closed at both ends to form a water enclosure. A number of such tubes are arranged in side-by-side relation and are covered by a plastic sheet cover layer. The cover provides an air gap to insulate the inner tubes and restrict heat loss. The tubes are used to form at least some of the modules of an aquaculture system for rearing fish and/or for effluent, waste or water treatment.

67 Claims, 13 Drawing Sheets

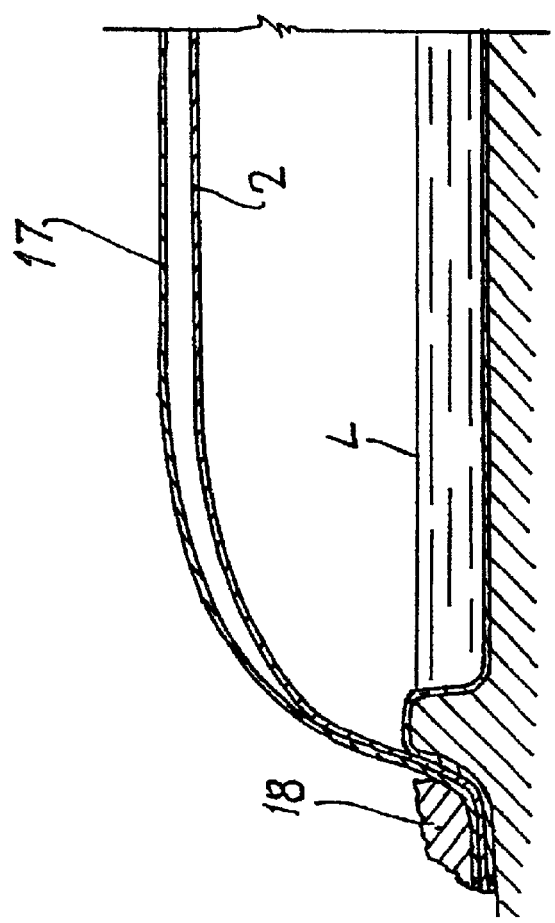
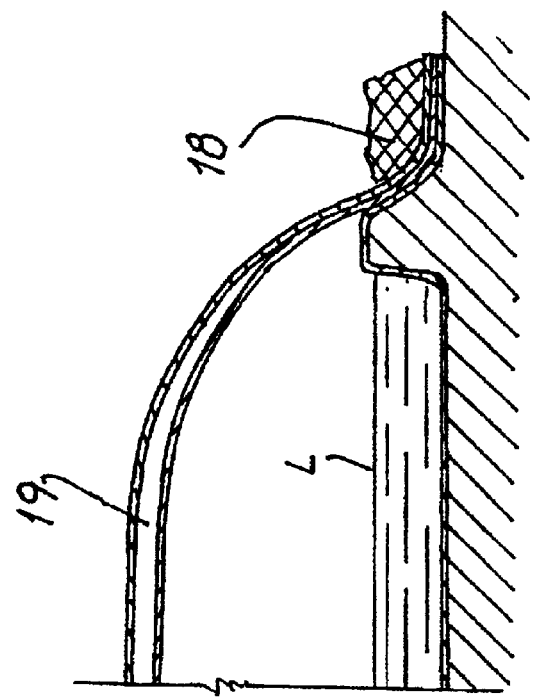
Fig. 3

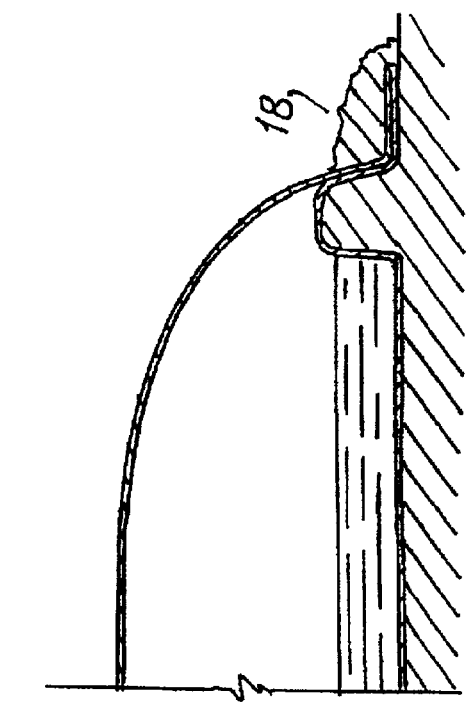
Fig. 6
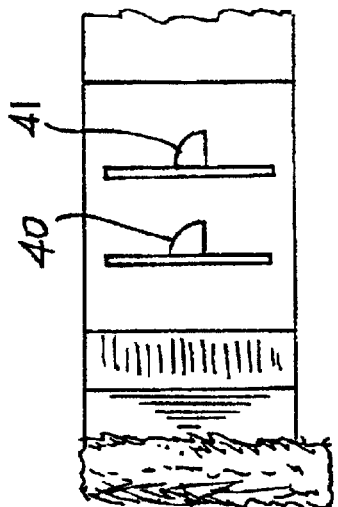
Fig. 7
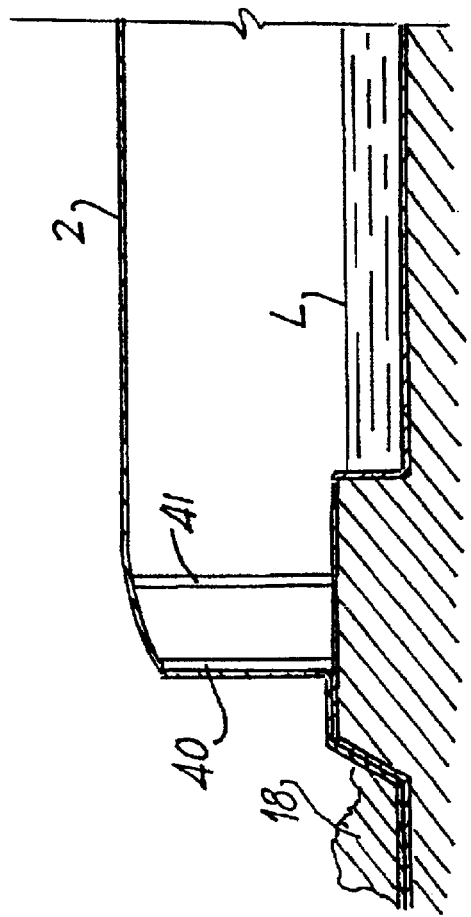
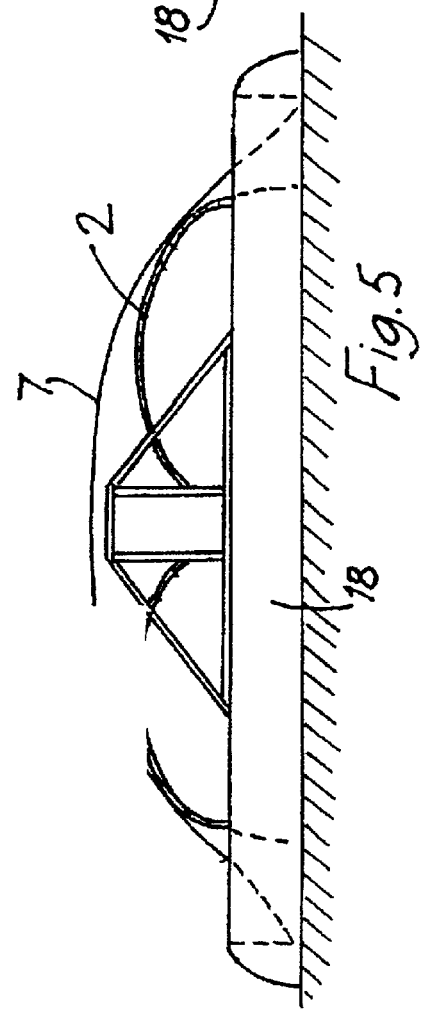
Fig. 5

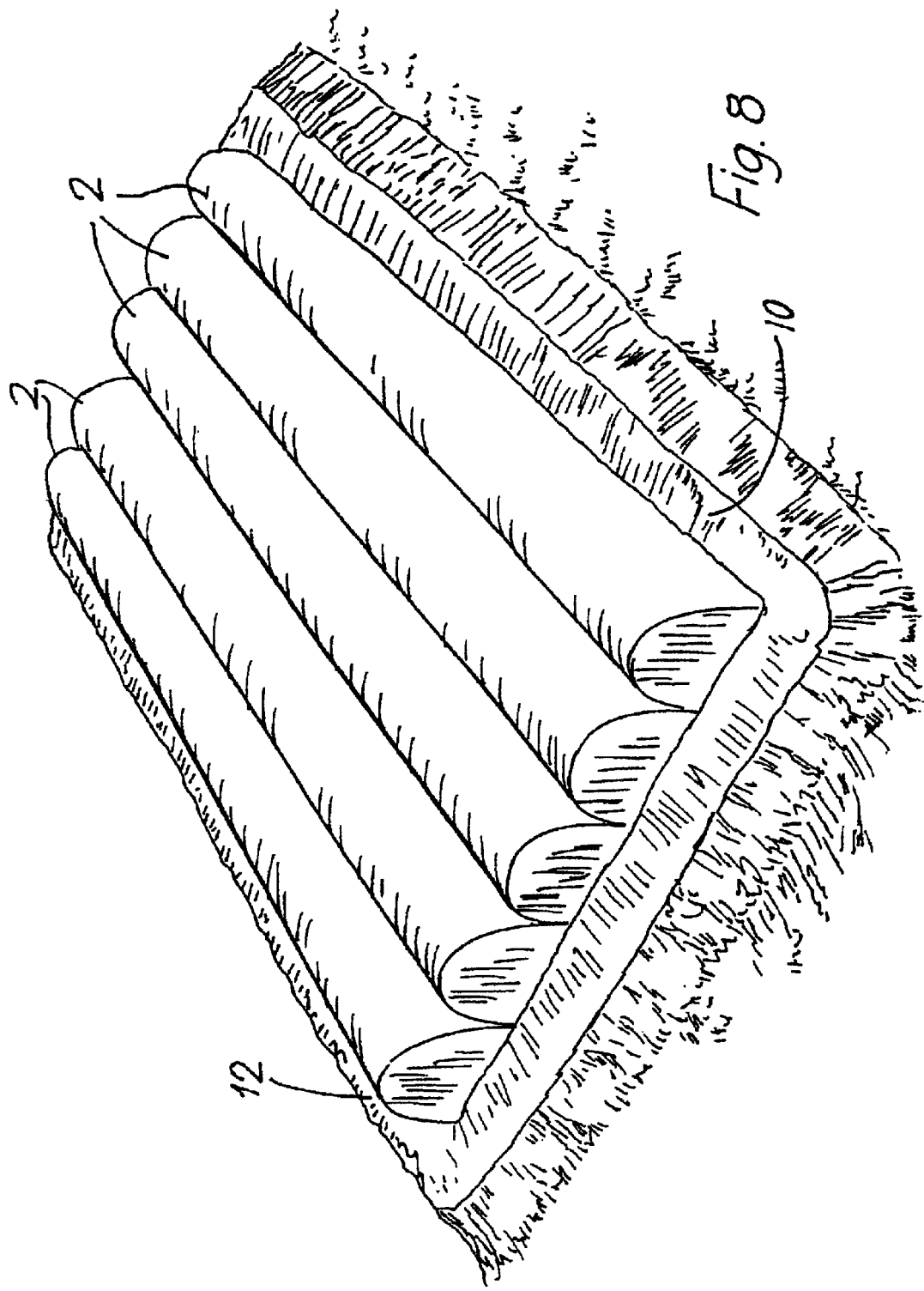

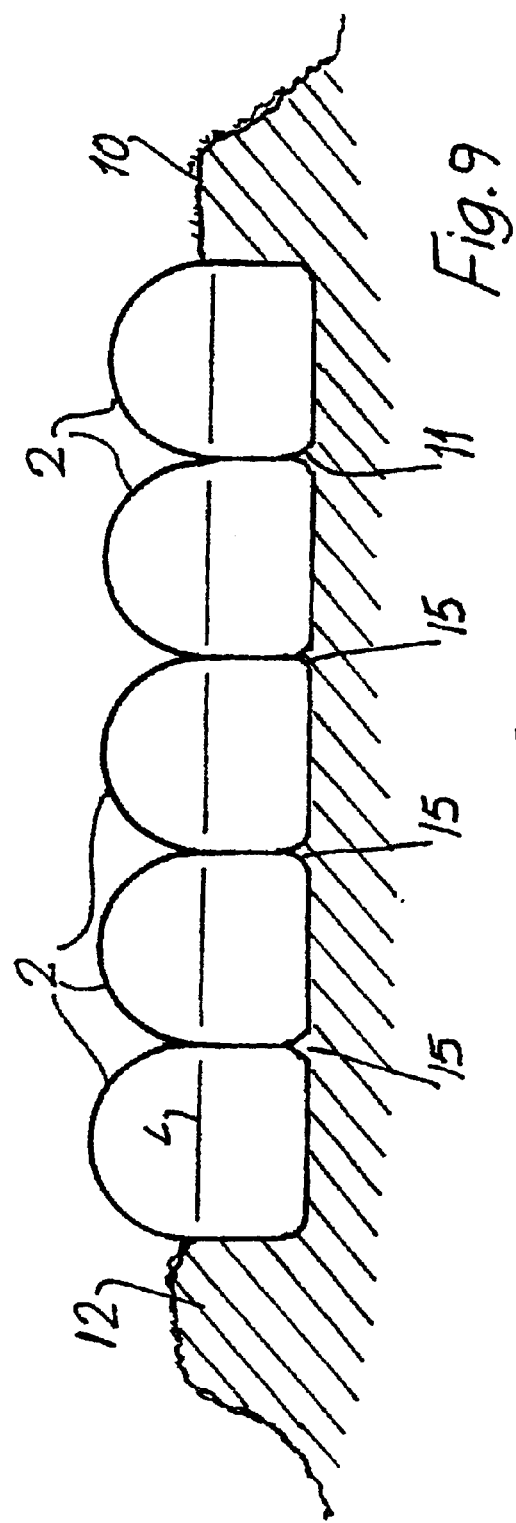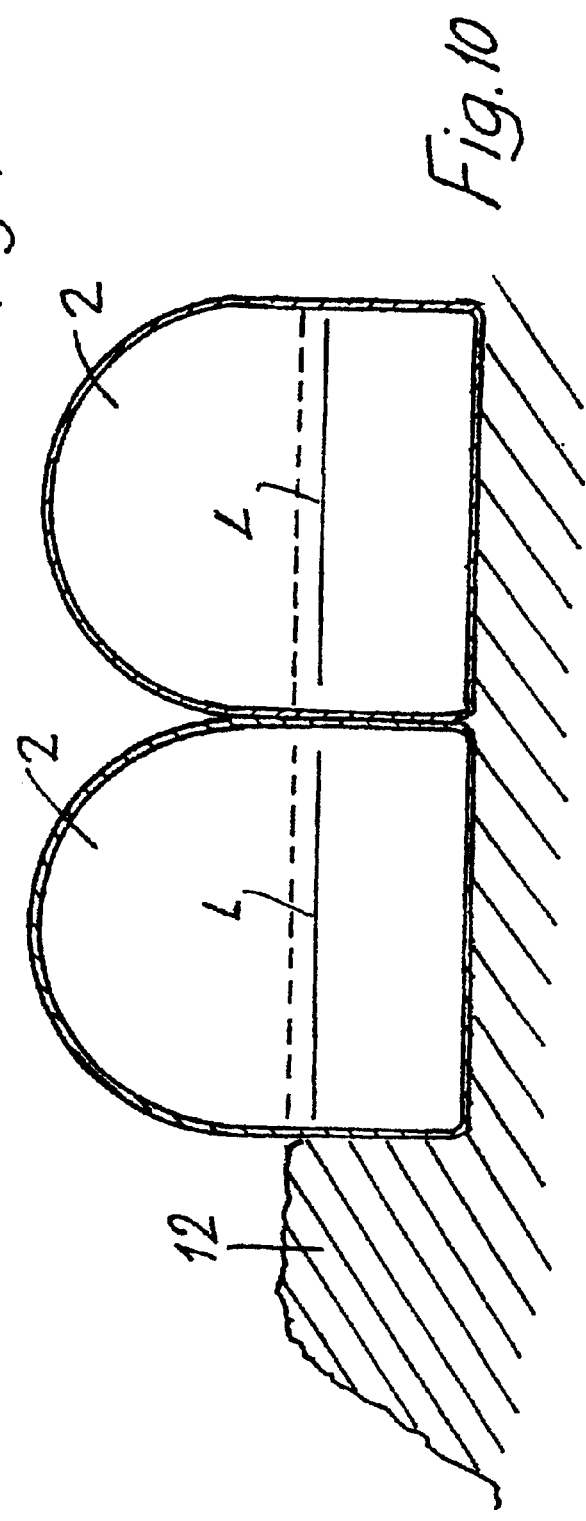

AQUACULTURE

This is a continuation of PCT/IE00/00122, filed Oct. 11, 2000 and published in English.

INTRODUCTION

The invention relates to fish farming systems and effluent, waste or water treatment systems which are generically referred to as aquaculture systems in this specification.

Conventional fish farm production systems are of two main types, namely a pond based system or a cage/raceway production system.

In pond production fish are stocked in growing ponds. Three regimes exist:
  (a) Fish are left to survive on the plant and animal life of the pond (typical yield 200 kg/hectare)
  (b) The ponds are fertilised (typical yield 1–2 ton/hectare)
  (c) Ponds are fertilised and the fish are also fed high grade food (yield 3–10 ton/hectare)

This type of fish farming is a batch process. Eventually the pond water becomes unsuitable for fish production and has to be replaced, either naturally (rain, etc) or by mechanical means. Generally the best yields achievable are 1 kg of fish per ton of water.

In cage fish farming, fish are held in cages floating in a large body of water (lake or sea) and the fish are fed complete diets. Fish waste drops through the meshes of the cages. This technique relies on the large body of water to dilute the water in the cages and so maintain suitable growing conditions. Yields based on cage area can be quite large, 100 tons per hectare. However, based on total water requirements yields are only of the order of one ton per hectare.

In raceway systems fish are housed in raceways and are fed complete diets. Fresh water is continuously passed through the raceway to remove waste and to maintain suitable growing conditions. Yields based on the area of raceway, can be up to 400 tons per hectare, however, based on water requirements (60 cubic meters of water per hour, per ton of fish) yields are of the order of 1 ton of fish per 0.5 million cubic meters of water.

In some raceway systems, wastewater is treated and recirculated. Treatment involves passing the water through aerobic digesters (sometimes called "active filters") and reoxygenation. This treatment is sufficient to reduce ammonia and nitrites to less toxic nitrates, but eventually the water becomes unsuitable for fish growing and has to be replaced. Biomass also builds up in the aerobic digesters. In the last few years there has been an increasing interest in using plants as a means of water treatment (the new fields of aquaponics). In this technique, the plants, e.g. tomatoes, lettuce, etc are grown hydroponically with wastewater from the fish being used as the hydroponic solution. The treated water from the hydroponic bed is then recycled to the fish containers. Some of the hydroponic plants are also used as a food supplement for the fish. Aquaponics is still an infant science and is not widely applied.

This invention is directed towards providing an aquaculture system which will overcome at least some of the problems with conventional systems.

STATEMENTS OF INVENTION

According to the invention there is provided an aquaculture apparatus comprising an elongate tube of flexible translucent material, the tube extending longitudinally along a tube site and having a lower section defining a water course. Preferably the tube is gas, especially air supported.

In a preferred embodiment the apparatus includes inflation means for inflating the tube and/or for maintaining the tube inflated. The inflation means is preferably an air handling means, especially a fan which is particularly suitable in a configuration in which the apparatus includes an access means. Alternatively the air handling means is a compressor which may deliver air through the water.

In a preferred embodiment the air handling means comprises a wind directing system for directing wind into the tube to inflate the tube and/or to maintain the tube inflated.

Preferably the apparatus includes access means for access to the tube. The access means may comprise an access door.

In a preferred embodiment the apparatus includes retaining means for retaining the tube in a desired position on a site. Preferably the retaining means extends longitudinally external of the tube. The retaining means may be a mound engaging the tube.

In a preferred arrangement there are a number of tubes which are arranged substantially parallel in generally side by side relation.

Preferably fluid connection means is provided between the tubes. The fluid connection means typically comprises a water-carrying channel means.

Preferably water flow control means are provided between the tubes. The water flow control means may include a weir means.

Ideally the or each tube is of plastics material.

Preferably each tube is for example of polyvinyl chloride or polyethelene. The material preferably comprises a number of layers. The material is preferably at least 100 microns thick and may be about 200 microns thick.

In a preferred embodiment the tube, in the expanded configuration has a diameter of at least 5000 mm, ideally a diameter of at least 6000 mm.

The or each tube is preferably at least 50 m long.

In a particularly preferred embodiment of the invention the apparatus includes a cover extending externally over the tube. The cover may be translucent or in very hot climates may form a shade.

Preferably the cover is at least partially spaced apart from the tube. A spacing between the outer cover and the tube preferably contains air. Indeed, the cover may be air supported.

In one embodiment the cover is of similar material to that of the tube.

The apparatus preferably includes cover retaining means for retaining the cover in position over the tube. Preferably the cover retaining means extends longitudinally of the cover and tube. The cover retaining means preferably also extends transversely of the cover and the tube. The cover retaining means may comprise a mound of clay or the like.

The apparatus may be adapted for rearing fish and/or for effluent and/or water treatment and/or for growing aquatic plants and/or for growing fish food.

The apparatus may define various modules of a fish rearing, effluent treatment, water treatment, aquatic plants, and/or fish food systems. For example the apparatus may form a digester module, a zooplankton module, higher order aquatic plants module, a dry matter content consuming module, and/or a fish rearing module.

The invention also provides an aquaculture system comprising a number of tubes as defined in the invention, the tubes defining at least some of the modules of an integrated system.

The aquaculture system preferably comprises:

an aerobic digester for digesting waste and producing biomass;

a primary algae treatment section for treating the biomass from the aerobic digester;

a zooplankton module for consuming the algae treated biomass and generating zooplankton and water;

an algae module for treating the water from the zooplankton module; and a dry matter content consuming section for consuming at least some of the zooplankton harvested from the zooplankton module.

In a preferred embodiment of the invention the aerobic digester and primary algae treatment section are provided in the same module.

In one embodiment of the invention the dry matter content consuming section is a fish rearing module.

In this case, preferably waste generated in the fish rearing module is digested in the aerobic digester.

In another aspect the invention provides an aquaculture apparatus comprising a plurality of tubes as defined in the invention, the tubes defining at least some of the modules of a fish rearing system.

In one embodiment the apparatus comprises:

a fish rearing module;

a digester module for treating by-products from the fish rearing module;

a zooplankton module for consuming biomass produced by the digester, the zooplankton module producing zooplankton and water; and an algae production module;

In this case the zooplankton module may be for producing carnivorous zooplankton.

Preferably the apparatus includes:

a herbivorous zooplankton module for consuming algae produced in the algae production unit; and a higher order plant module for consuming waste produced by the herbivorous zooplankton module.

Ideally carnivorous zooplankton from the carnivorous zooplankton module provide food which is fed to the fish in the fish rearing module.

Preferably herbivorous zooplankton from the herbivorous zooplankton module provide food which is fed to fish in the fish rearing module.

In one arrangement higher order plants produced in the higher order plant module provide food which is fed to fish in the fish rearing module.

Purified water produced in the higher order plant module preferably provides a water supply to the fish rearing module.

In a particularly preferred embodiment at least some of the modules are defined by an elongate tube of flexible translucent material, the tube extending longitudinally along a tube site and having a lower section defining a water course.

In a further aspect the invention provides an aquaculture system comprising:

an aerobic digester for digesting waste and producing biomass;

a primary algae treatment section for treating the biomass from the aerobic digester;

a zooplankton module for consuming the algae treated biomass and generating zooplankton and water;

an algae module for treating the water from the zooplankton module; and a dry matter content consuming section for consuming at least some of the zooplankton harvested from the zooplankton module.

Preferably the aerobic digester and primary algae treatment section are provided in the same module.

In one embodiment the dry matter content consuming section is a fish rearing module. In his case preferably waste generated in the fish rearing module is digested in the aerobic digester.

In another aspect the invention provides an aquaculture system comprising:

a fish rearing module;

a digester module for treating by-products from the fish rearing module;

a zooplankton module for consuming biomass produced by the digester, the zooplankton module producing zooplankton and water; and an algae production module.

The zooplankton module may produce carnivorous zooplankton.

Preferably the aquaculture system includes:

a herbivorous zooplankton module for consuming algae produced in the algae production unit; and a higher order plant module for consuming waste produced by the herbivorous zooplankton module.

Carnivorous zooplankton from the carnivorous zooplankton module preferably provide food which is fed to the fish in the fish rearing module.

Herbivorous zooplankton from the herbivorous zooplankton module preferably provide food which is fed to fish in the fish rearing module.

Higher order plants produced in the higher order plant module preferably provide food which is fed to fish in the fish rearing module.

Purified water produced in the higher order plant module preferably provides a water supply to the fish rearing module.

In a particularly preferred embodiment at least some of the modules are defined by an elongate tube of flexible translucent material, the tube extending longitudinally along a tube site and having a lower section defining a water course.

BRIEF DESCRIPTION OF THE DRAWINGS

The invention will be more clearly understood form the following description thereof given by way of example only with reference to the accompanying drawings, in which:

FIG. 3 is a longitudinal cross sectional view of the aquaculture apparatus of FIG. 1;

FIG. 5 is a diagrammatic end view of another aquaculture apparatus according to the invention;

FIG. 6 is a longitudinal cross sectional view of part of the apparatus of FIG. 5;

FIG. 7 is a plan view of one end of the apparatus of FIG. 6;

FIG. 8 is a diagrammatic perspective view of an aquaculture apparatus according to another embodiment of the invention;

FIG. 9 is a transverse cross sectional view of the apparatus of FIG. 8;

FIG. 10 is a transverse cross sectional view of the apparatus of FIG. 8 on an enlarged scale;

DETAILED DESCRIPTION

Figure 1:
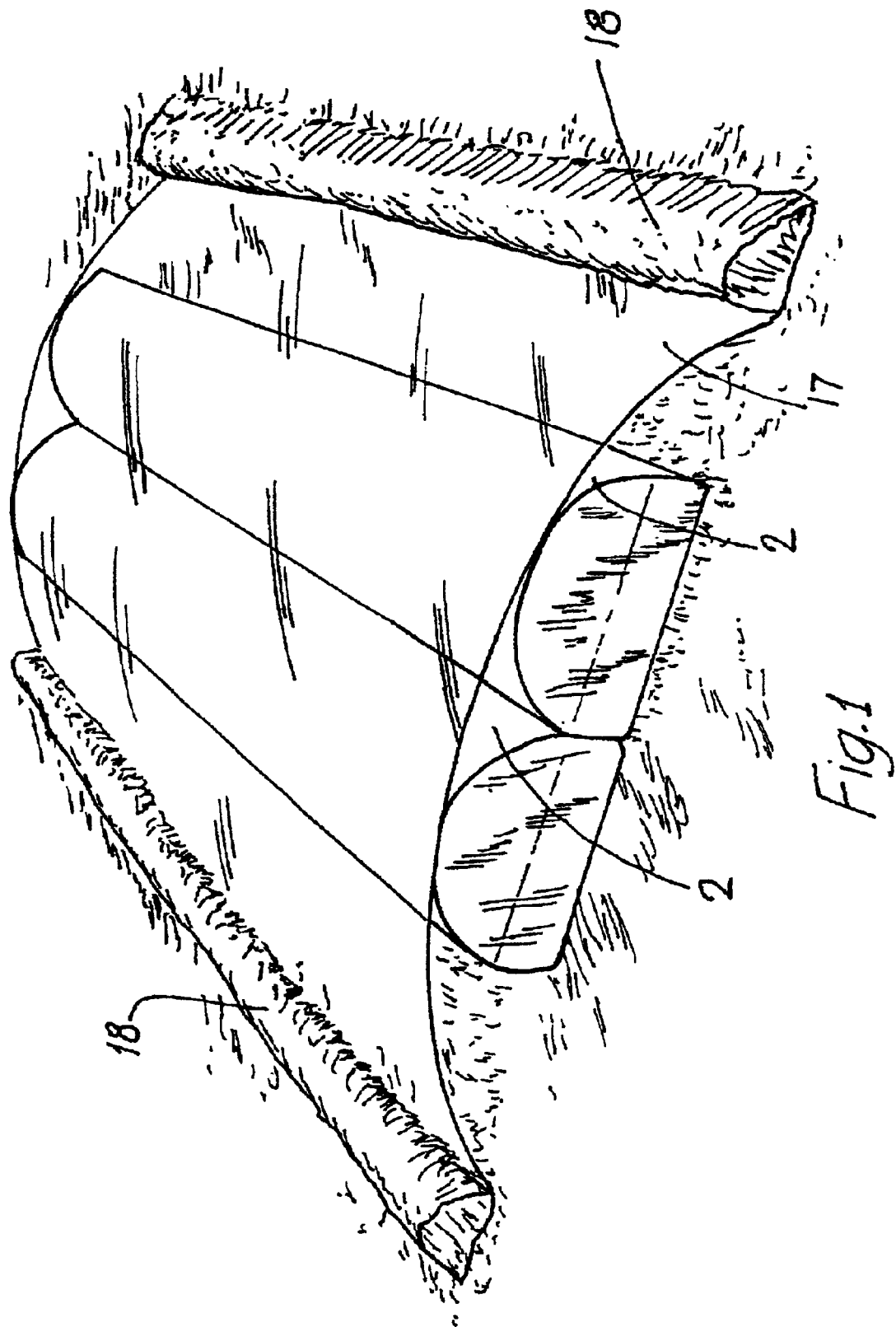
FIG. 1 is a diagrammatic perspective view of an aquaculture apparatus according to the invention.
Figure 2:
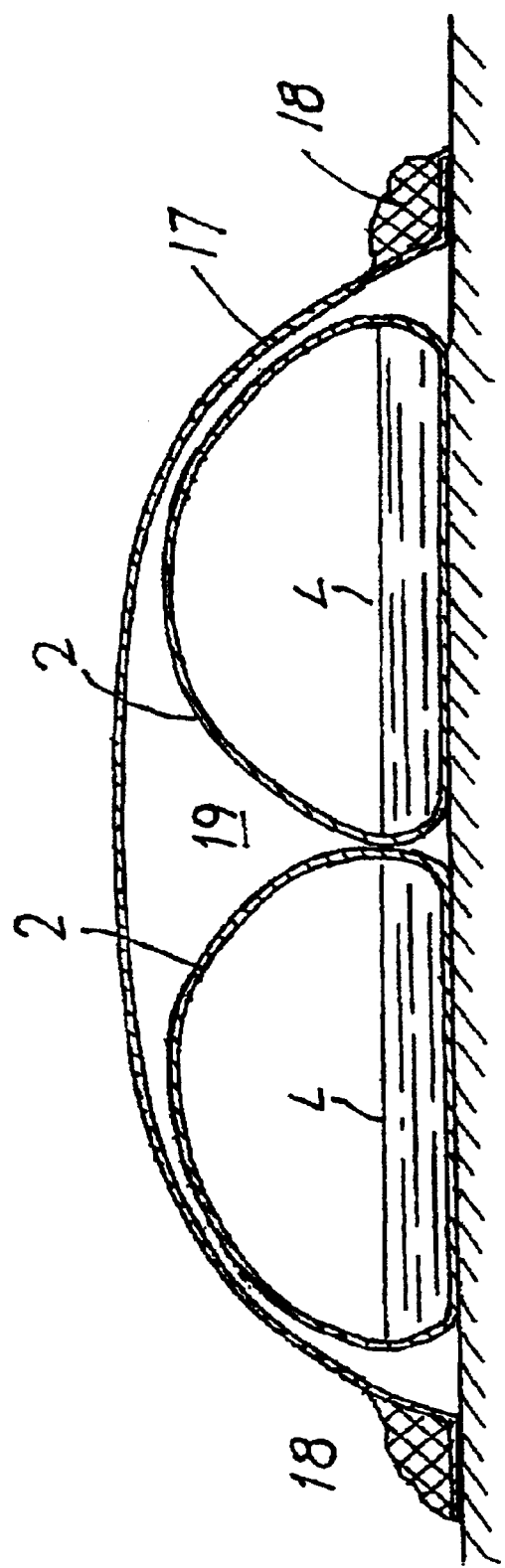
FIG. 2 is a transverse cross sectional view of the aquaculture apparatus of FIG. 1.

Referring to the drawings there is illustrated an aquaculture apparatus comprising an elongate collapsible tube 2 of flexible translucent plastics material. The tube 2 is inflatable to be air supported in the expanded in use configuration illustrated for example in FIGS. 1 to 3.

The tube is formed from a plastics material such as that available from Autobar Plastics of France under the trade name Idalene Ceva 4S. The diameter of the expanded tube 2 is at least 600 mm and may be up to 6 m or greater. The tubes 2 are mounted on a reel and may be cut to any desired length, typically 100 meters or longer.

The tube 2 may be inflated either by a suitable fan and/or by using a wind directing system in the form of a venturi at one end of the tube 2. The other end of the tube 2 is closed off to prevent air escape. A fan may be used to maintain air support, especially where an access way is provided.

In use, water is pumped into each tube, typically to a level L corresponding to a desired depth of about 300 to 1000 mm.

Figure 4:
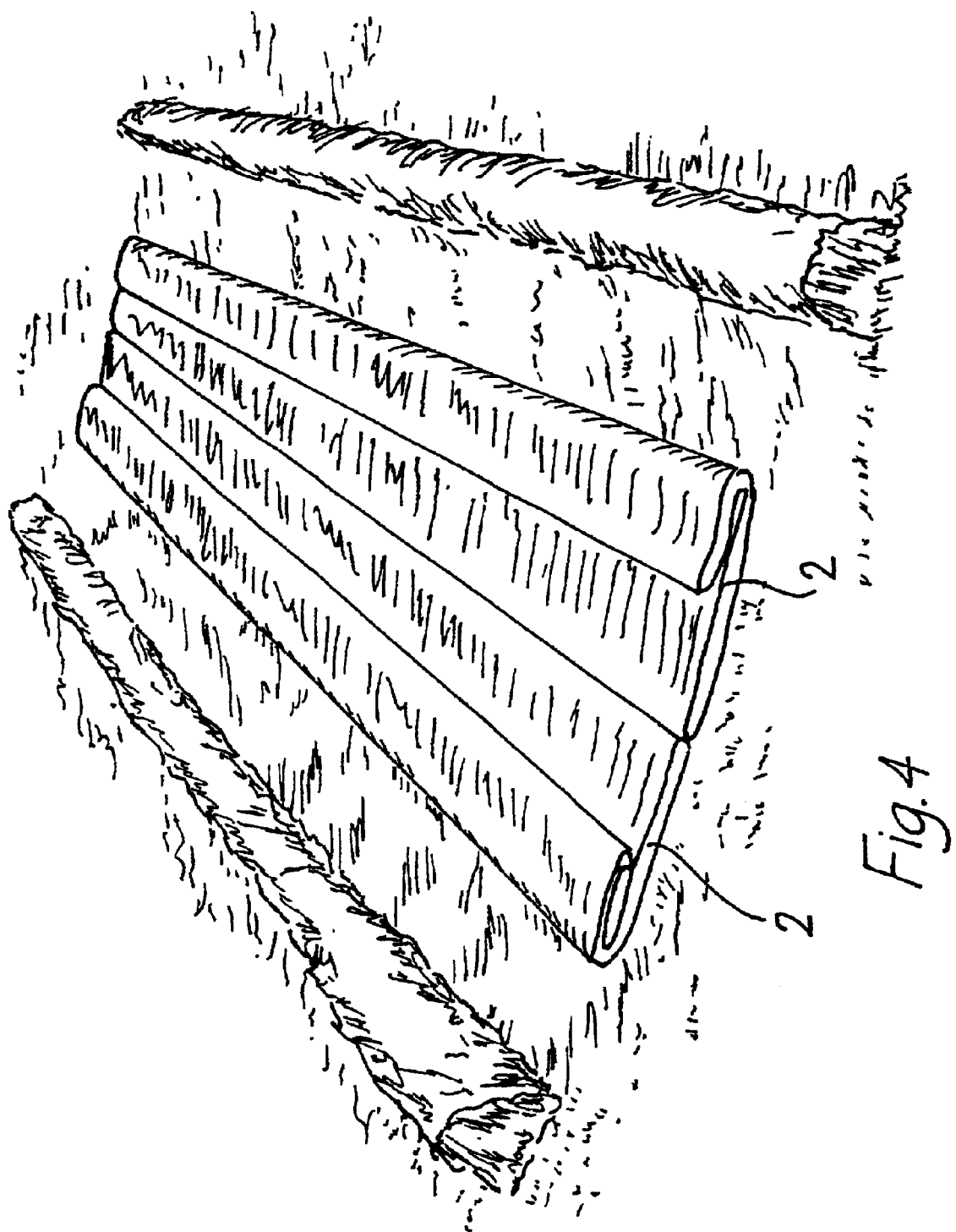
FIG. 4 is a perspective view of the aquaculture apparatus being assembled.
Figure 11:
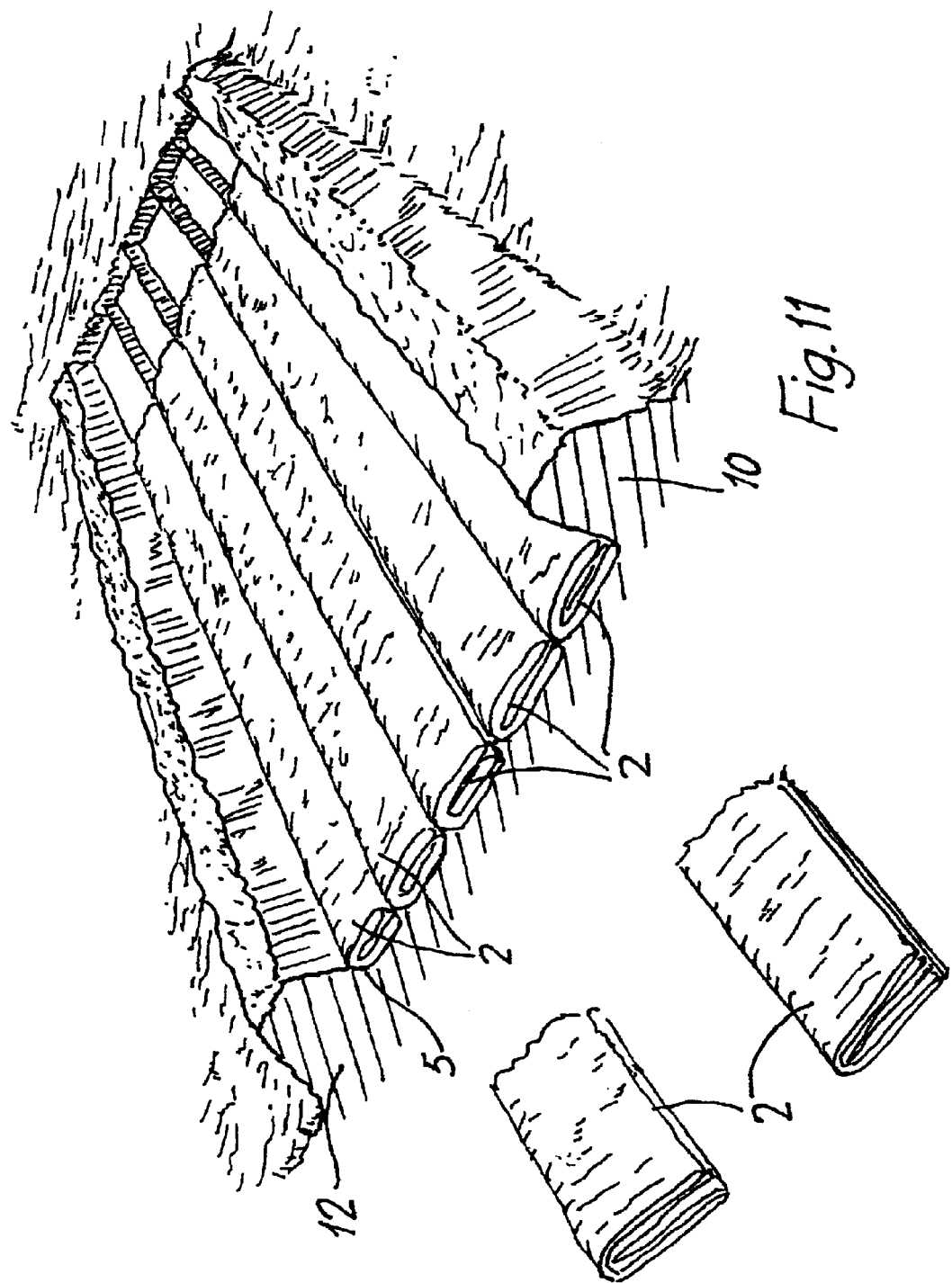
FIG. 11 is a perspective view of the apparatus of FIGS. 8 to 10 being assembled.

Referring in particular to FIGS. 1 to 4 in this case there are two tubes 2 which are arranged to extend longitudinally side by side along a suitable site with level ground as illustrated in FIG. 4. Each tube 2 is then inflated and is maintained supported by air. The adjacent tubes 2 are covered by an outer layer of translucent insulating film material. The outer layer 17 may be of the same material as that of the tubes 2. The outer layer 17 provides an air gap 19 which insulates the inner tube 2 to restrict heat loss. In addition, the outer layer 17 assists in protecting the tubes from ingress by predators such as birds.

The cover 17 may be translucent, or in particularly hot climates may be of opaque material for shading. It may be pulled relatively tight over the tubes, or preferably may itself be at least partially air supported.

Air may be delivered by a fan through an inlet at one closed end of one tube 2 and led from one tube 2 to an adjacent tube. In the case of an air supported cover, at an end of the second tube some air may be bled into the space between the tubes 2 and the cover 17 to support the cover.

Retaining means in the form of mounds 18 of clay are applied over the side edges of the outer layer 17. The outer layer 17 is closed as both ends and mounds 18 are also applied at the end edges of the outer layer 17. The mounds 18 not only assist in retaining the layer 17 in position but also act as a wall to retain water, if necessary, for example on deflation of the tubes.

Referring to FIGS. 5 to 7 the arrangement is similar to that of FIGS. 1 to 4 except that in this case the apparatus includes an accessway. The accessway comprises two spaced-apart doors 40, 41 which form an air lock 42 therebetween. The doors 40, 41 are mounted in frames which are sealed to the tubes 2 and/or the cover 17. In this case a cover is omitted in FIG. 6.

In the arrangement illustrated in FIGS. 8 to 11 the tubes 2 are arranged to extend longitudinally side by side to form at least some modules of an integrated aquaculture system. In this case a track 5 is dug in the ground on a suitable, typically flat, site. A mound 10 is built up on one side of the elongate track 5 and a first tube 2 is laid down. The tubes are then inflated and are air supported. The exposed longitudinal edge of the first tube 2 may be supported by a smaller elongate mound 11. Adjacent tubes 2 are arranged in a similar way until the last tube 2 in the system is laid and supported by a second main mound 11. Between the main mounds 10, 11 the tubes effectively support one another. Additional retaining mounds 15 may be provided between adjacent tubes 2.

A water system may be provided for directing water from one tube 2 to another. A suitable weir, lock system and/or pumping may be used for this purpose.

Figure 12:
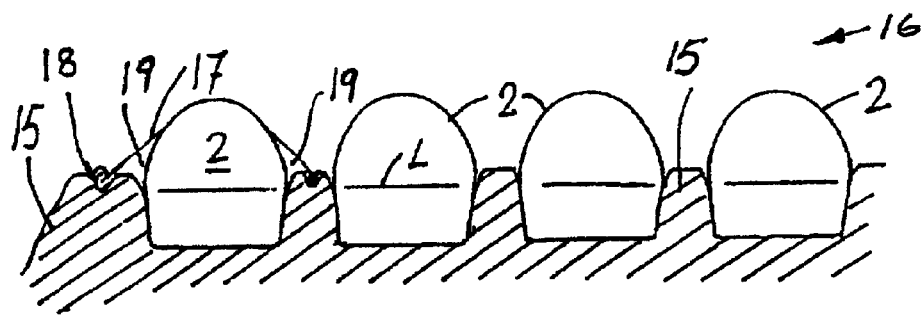
FIG. 12 is a transverse cross sectional view of a further aquaculture apparatus of the invention.
Figure 13:
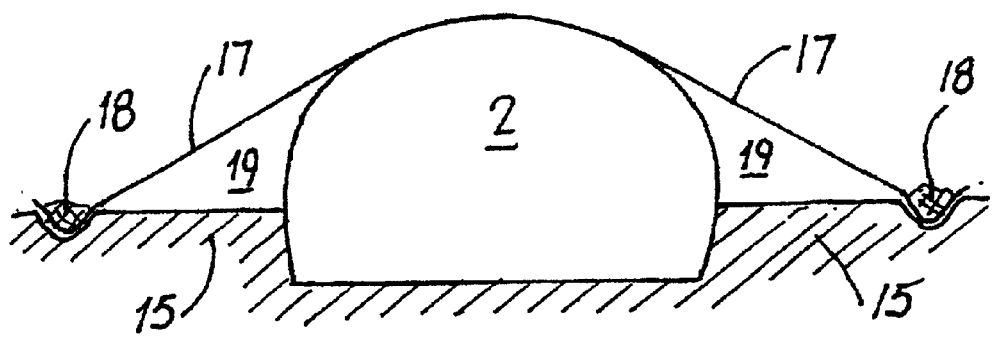
FIG. 13 is a cross sectional view of an enlarged scale of part of the apparatus of FIG. 12.

Referring to FIG. 12 there is illustrated another aquaculture apparatus 16 which is similar to that described above with reference to FIGS. 1 to 4 and like parts are assigned the same reference numerals. In this case the additional retaining mounds 15 are larger so that each tube 2 is separately supported. In this case and as illustrated in FIG. 13 some or all of the tubes 2 may be covered by an outer layer 17 of translucent insulating film material which is retained on either side of the tube 2 by retaining mounds 18. The outer layer 17 provides an air gap 19 which insulates the inner tube 2 to restrict heat loss.

Figure 14:
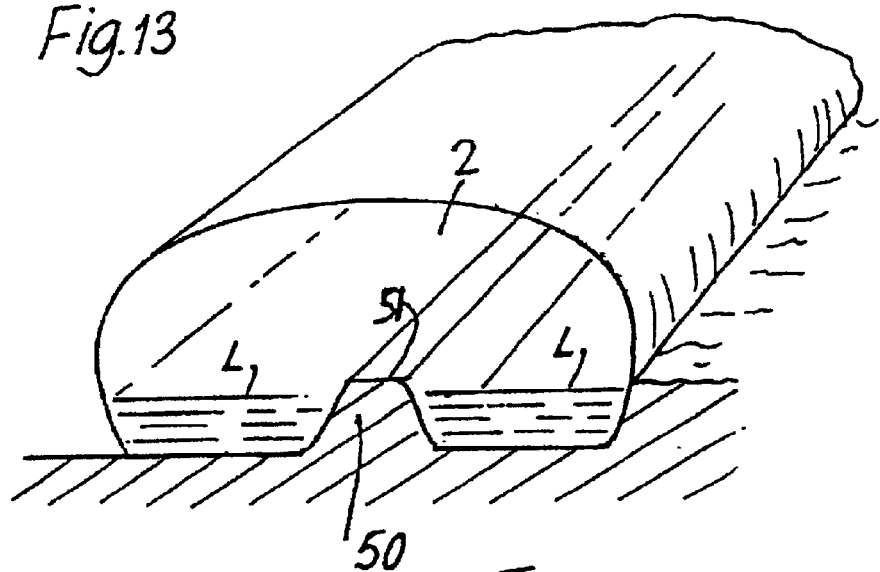
FIG. 14 is a cross sectional view of part of yet another aquaculture apparatus of the invention.

Referring to FIG. 14 there is illustrated a single tube of another aquaculture apparatus of the invention. In this case an intermediate support mound 50 is provided which divides the lower part of the tube 2 into a pair of tube parts which are separated by an elongate section 51 which may be used to provide an access walkway above the level L of the water in the tube parts.

Figure 15:
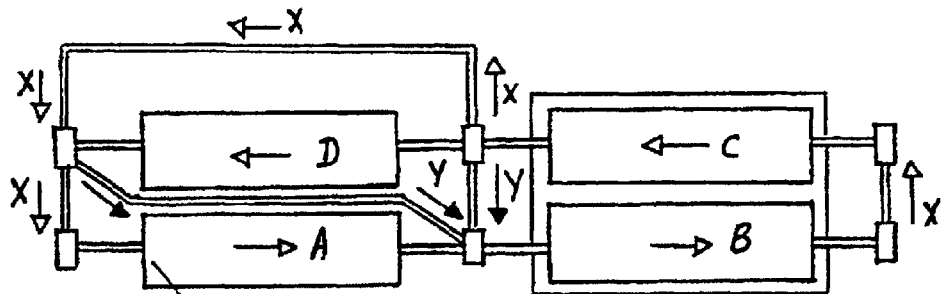
FIG. 15 is a block diagram of an aquaculture system according to the invention.

Referring to FIG. 15 there is illustrated an aquaculture system which may be used for rearing fish or for effluent/waste treatment. A first module A is a dry matter content consuming module which may, for example, be a fish rearing module. A second module B is an aerobic digester for digesting waste which may be delivered directly into the module B and/or may be waste generated in the fish rearing module A. The module B also includes a primary algae treatment section for treating the biomass generated by the aerobic digester. The aerobic digester and primary algae treatment are preferably provided in a single module B for ease of construction and control in use. A third module C is a zooplankton module for consuming the algae treated biomass. Zooplankton generated in module C is fed to the dry matter consuming module A. Waste from the zooplankton module is delivered into an algae treatment module D in which the water is purified by a tertiary treatment using algae. The purified water generated in the algae treatment module D is either used as a water supply for module A when it is a fish rearing module and/or the water may be drawn off for re-use or discharge. The flow of water through the system and the direction of feedback control loops are indicated in FIG. 15 by arrows X and Y respectively.

Figure 15A:
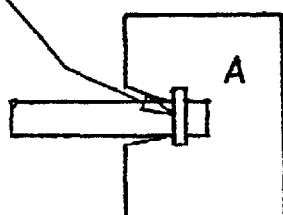
FIG. 15(a) is a diagram illustrating the jointing of a module interconnecting pipe to a plastics tube module.

FIG. 15(a) illustrates the jointing of a module interconnecting pipe 70 to a plastics tube 2 forming one of the modules. The pipe 70 is inserted into a hole in the tube 2 and the hole is sealed by a jointing means 71 in the form, for example of a deformable rubber seal and a jubilee clip to grip the tube to the seal.

The four module unit is the minimum configuration in the sense that is necessary to separate physically the different process that takes place. This could in principle be carried out in one long tube but the process would be difficult since it involves using the water from each module at different rates.

Figure 16:
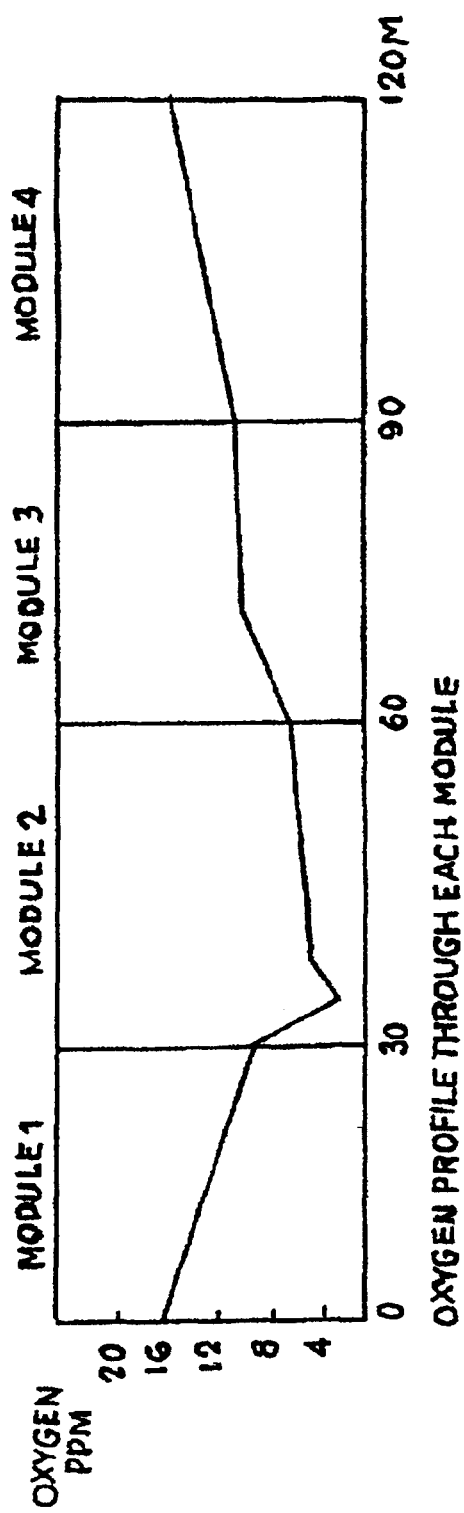
FIG. 16 is a graph of typical oxygen concentration through each module of the system of FIG. 15.

FIG. 16 shows how oxygen levels change through each module. Similar changes also occur in the pH, ammonia, nitrate, sulphate and phosphate levels. In this case each of the modules is 30 m long and the graph shows how the oxygen level oscillates through the modules. The pH level in general tracks the oxygen level and this oscillation has the effect of killing off most pathogens. By adjustment of various parameters the system can be tuned using feedback control.

These cycles in the oxygen levels, pH, etc, are important to the operation of the system. If the pH of the water entering the algae module D is greater than 7.5 then on a sunny day>2.5 kwh/day m then the pH can rise above 10 which is lethal to fish. It is therefore necessary to keep the pH below 7.5 in fish production (but not in sewage treatment) by passing water of 7.5 pH through a module containing higher order plants (e.g. azolla or water hyacinth), the pH is reduced to 6.5.

Figure 17:
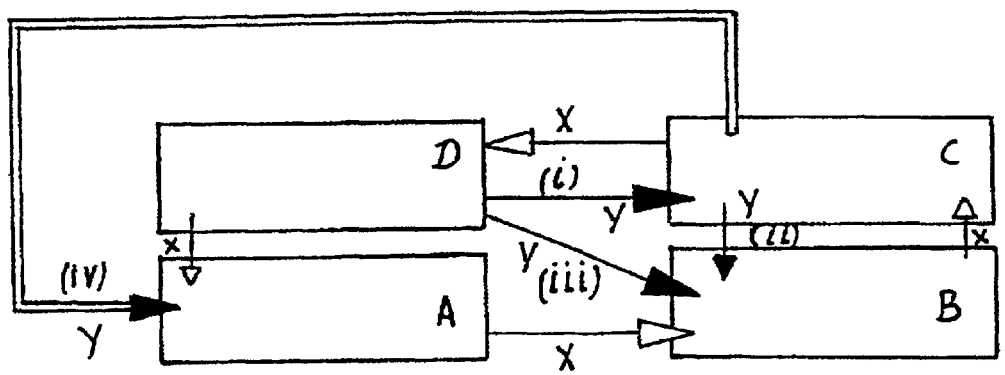
FIG. 17 is a block diagram of another aquaculture system according to the invention with negative feedback loops.

Referring to FIG. 17 there is illustrated a schematic diagram of a four module system similar to FIG. 15 in which water flow is indicated by arrows X and negative feedback loops are indicated by arrows Y. The system has the following negative feedback loops.

(i) module D to module C
(ii) module C to module B
(iii) module D to module B
(iv) module C to module A The key to how the system works is to balance the two biological processes described by the following two equations.

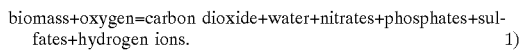

biomass+oxygen=carbon dioxide+water+nitrates+phosphates+sulfates+hydrogen ions.    1)

This is the oxidization process.

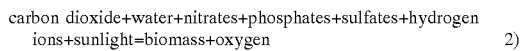

carbon dioxide+water+nitrates+phosphates+sulfates+hydrogen ions+sunlight=biomass+oxygen    2)

This is the photo reduction process.

In most sewage and water recirculating systems attention is mostly given to the oxidation process. Water is biologically oxidised in aerobic digesters (anaerobic conditions are not discussed here). Oxygen is supplied to the system and the nitrates, phosphates, sulfates and hydrogen ions are then treated separately.

In this system the oxidation and photo reduction processes are given equal consideration.

If the photo reduction process is allowed to dominate then the pH of the system will increase and the system will crash.

If the oxidation process is allowed to dominate the system will become anaerobic, the pH will drop and the system will crash.

In order to prevent either of these situations arising and to keep into account the variations in sunlight and temperature (the main random variables in this system), the system is fitted with the four negative feedback loops labelled (i) to (iv) in the schematic diagram.

The relative sizes of the different modules is designed to suit the local conditions and the production levels. Unlike the existing recirculating processes based mainly on the oxidation process there is a minimum level of consumers (fish, zooplankton, etc.) that must be produced to counteract the photo reduction process. Photosynthesis rates of 8% of incident light have been archived with this system but 3% is more typical.

Feedback loop (i) is used to decrease the photo reduction process and increase zooplankton levels.

Feedback loop (ii) is used to alter the oxidation process with minimum effect on photo reduction.

Feedback loop (iii) is used to increase oxygen levels in module 2 to prevent it becoming anaerobic.

Loop (iv) is used to lower the zooplankton level and increase the fish biomass.

In sewage treatment allowing the algae in module D to increase in density allows the pH to rise to 10.5. Above pH 8.4 the phosphates precipitate out. Each one unit increase in pH gives a tenfold increase in the amount of precipitation of phosphates. Thus, purified water which is high in oxygen but low in phosphates can be discharged.

Sewage treatment involves taking used water with a high organic component and biological oxygen demand (BOD) and treating it to reduce the suspended organic load and BOD to 30 and 20 p.p.m. respectively.

Organic waste+treatment+oxygen=

1) Synthesis i.e. increased sludge which is removed.
2) Degradation and hydrolysis which gives nitrates phosphates sulphates carbon dioxide water and hydrogen ions.

There are three main treatments:

(a) anaerobic
(b) aerobic
(c) photo-autotrophs

It is possible to use gas supported plastic tubes in all three treatment processes.

The use of air supported plastic tubing in sewage treatment depends on the climate.

In temperature climates the higher temperatures that are attained in the tubes allow the rate of photosynthesis to increase. Photosynthesis increases the rate of oxygenation of the system and thus destroys anaerobic bacteria.

Photosynthesis also increases the pH. It is not unusual to have the pH rise from pH to 7.5 to pH of 9 or 10. Above a pH of 8.1 up to 80% of phosphates are precipitated as calcium phosphate. For every unit increase in pH, the amount of phosphate in the final effluent is deceased by a factor of 10. Also as the pH within the tubing increases most algae and other organisms are killed and precipitate out.

In very warm climates the temperature of the water in the air supported polytubes can easily rise above 50° C. and pasteurise the water. At high temperatures thermophilic organisms also break down organic nitrates. So depending on the climate, the air supported polytubes can be used for water purification.

In situations where the BOD requirements of effluent is high the oxygen in the air supported polytubing can be used up and the tubing can become anaerobic. This situation is equivalent to the grease build up in anaerobic ponds, however the sealing nature of the plastic stops the spread of odours which is the main problem with this system. Also the plastic can be used to trap the methane and other combustible gases which are released in anaerobic process and these gases are then available for use.

Figure 18:
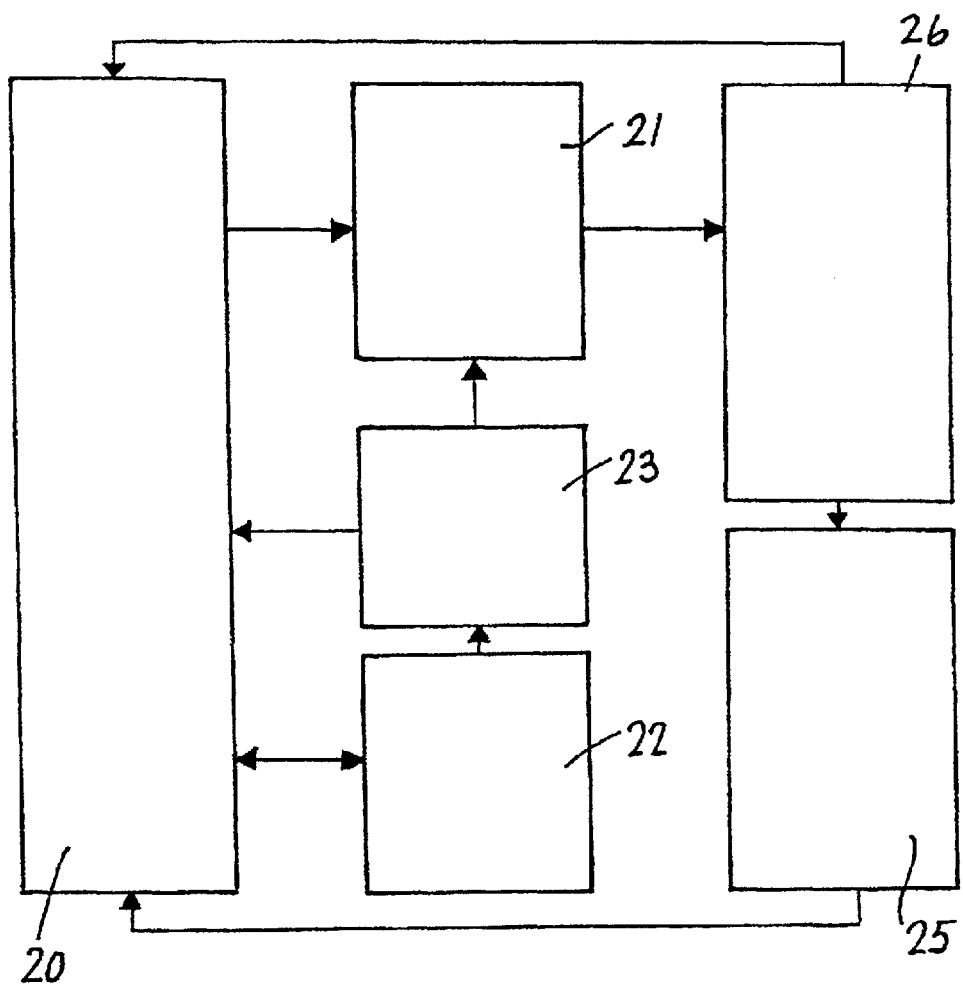
FIG. 18 is a block diagram of another aquaculture system of the invention.

Referring to FIG. 18 an aquaculture system of the invention comprises a number of production modules as follows:

(a) Fish production in a main pond 20
(b) Algae production in a second pond 21
(c) Aerobic digesters in a third pond 22
(d) Carnivorous zooplankton (e.g. moina) for fish food in a fourth pond 23
(e) Algae (as food for herbivorous zooplankton)
(f) Herbivorous and omnivorous zooplankton e.g. daphnia, fair shrimp in a fifth pond 26.
(g) Higher order aquatic plants for fish food (e.g. azolla) in a sixth pond 25

The important features of the process are that the product in each module is harvested on a continuous basis, the level of production in each module is adjusted to suit its interconnecting modules, and the water is monitored and adjusted to suit each production module.

With appropriate nutrients, the overall limit on production is the level of sunlight received by the algae and plants. The overall production fixes between 1.6 to 2.3% of the sunlight obtained by the algae and plants and is approximately 1 kg of fish per square meter, per year.

The efficiency of the system is therefore dependent on the temperature and growing conditions provided by the flexible tubing 2. The production capacity of each module should be matched to its interconnecting module(s).

(1) The digester 22 denatures the metabolic by-products from fish production and various fish pathogens.
(2) The biomass (bacteria, yeasts, etc) produced by the digester 22 is consumed by the carnivorous zooplankton (e.g. moina) 23 which are in turn fed to the fish 20.
(3) The water from the moina is used in algae production 21.
(4) The build-up of minerals such as Ca, P and K and nitrates etc in the fishpond 20 is prevented by passing the water from the fishpond to the algae module 21.
(5) The algae 21 is then used as food for the herbivorous zooplankton 26 such as daphnia, airy shrimp, shellfish, etc. which can also be used as fish food.
(6) The waste products from the herbivorous zooplankton are used by the higher order aquatic plants 25 and the purified water is returned to the fish rearing module 20. The azolla and other plants are also used as fish food.

The following is a list of the main fish food crops produced within the system:

(1) Algae such as Chlorella, Scenedesmus, etc.
(2) Daphnia magna, an algae eater. The reproductive cycle of Daphnia magna at elevated temperatures is less than 10 days and this allows for 10% harvest per day.
(3) Moina dubia lives on bacteria produced in the aerobic digester.
(4) Tanymastic stagnalis used in spring and autumn when temperatures are less than 20 C, is an omnivore and grows to 1.5 cm in size.
(5) *Thamnocephalus platyurus* only grows when temperature >20C, grows to 2 cms.
(6) Azolla: a high protein plant for herbivorous fish. Our experiments show that approximately ⅓ of the dry matter content is converted into fish biomass. Under favourable conditions we have found that azolla can double its weight in 7 to 10 days allowing for a 10% harvest per day.

Actively feeding Daphnia and Moina are a good food source for fish up to 5 grms in weight. For larger fish the effort involved in catching these small organisms reduces the over all conversion rate. For larger fish the fairy shrimps are the best source of food. White cloud mountain minnow are also a good food source for larger carnivorous fish.

Figure 19:
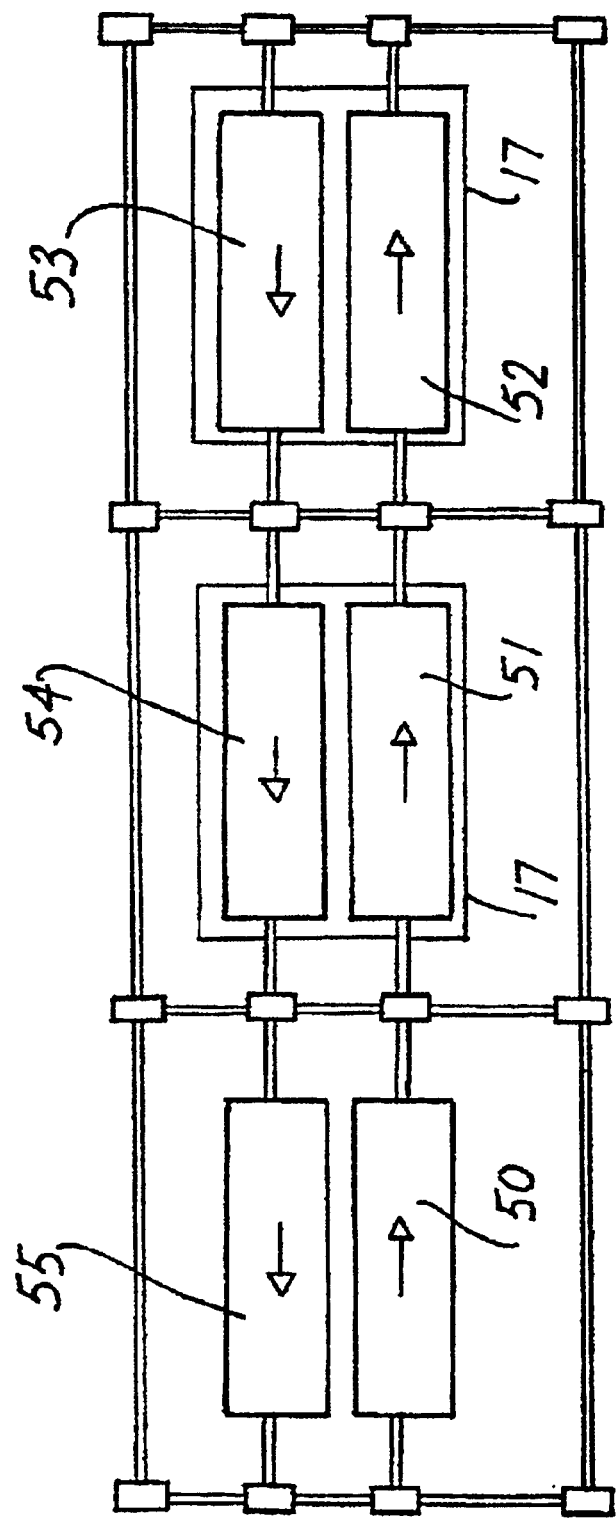
FIG. 19 is a block diagram of a further aquaculture system of the invention.

Referring to FIG. 19 there is illustrated an example of a six module system similar to FIG. 18. In this case the modules comprise a fish raceway 50, an aerobic digester and algae pond 51, a zooplankton module 52, a higher order plants (azolla etc.) module 53, an algae module 54 and a heat exchanger 55. The arrows indicate the direction of water flow. Modules 50, 51, 52 and 54 are equivalent to modules A to D respectively described above with reference to FIG. 15. The heat exchanger module 55 is used to stabilise the water temperature, especially when the water is to be used in the fish rearing module.

The outer box around the module pairs 51, 54 and 52, 53 indicates an optional cover over two tubes—similar to the arrangement of FIGS. 1 to 4.

The aquaculture system of the invention has several advantages over conventional systems. These include the following.

(1) Because they are closed systems they have no polluting discharges.
(2) They can be filled with rainwater and as such are not limited to being located near rivers or the sea.
(3) The elevated temperatures allow for the rapid production of food organisms within the system. This is a major economic advantage of polytunnels.
(4) The range of products is much greater.

Higher food conversion ratios are achieved. In normal intensive fish farming 1.5–1.6 kg of food (dry weight) is needed to produce 1 kg of fish (wet weight). This means that up to 80% of the dry matter is wasted and discharged from the system. These excess nutrients cause eutrophication of the local water systems with uncontrolled algae blooms. Within the aquaculture system of the invention algae growth is controlled and is fed to zooplankton which are in turn fed back to the fish. Thus 1 kg (dry weight) of food will give a much higher food conversion rate than conventional processes.

There is no pollution of local water systems. Most recycled water systems are based on biological filter beds that have to be back flushed and have discharges to either a sewage system or directly to the environment. This is wasteful of resources and puts a strain on the environment. Sunlight has a direct effect on reduction of pathogens. Most "recycled" systems have a build up of metabolics over time. Because of this they are not complete recycled systems.

Specialisation of sites is not necessary. Present fish farming is restricted to particular locations, i.e. rivers, lakes, fords or areas with high water tables/low permeable soils. This system allows fish farming to be carried out anywhere where there is sufficient level ground. Once the tubes are filled with water evaporational losses are very low. (In experimental systems, evaporation of water has been less than 50 per annum). The system is suitable for both fresh water and sea water use.

Production cycles are significantly shorter. The higher temperature in the tunnels allows for shorter production cycles (for carp and tilapia, typically 150 days)

It will be appreciated that the apparatus of the invention may be utilised as elements in an integrated system for rearing fish, aquatic materials effluent treatment, waste treatment, water treatment and the like. The apparatus may also be used as an individual element to enhance the performance of existing nonintegrated systems.

A gas other than air may be used to support the tube. For example, oxygen may be used in some instances. In other cases other gases such as methane may be available for use as at least portion of the gas support.

The invention is not limited to the embodiments hereinbefore described which may be varied in detail.

What is claimed is:

1. Aquaculture apparatus comprising
   an elongate tube of flexible translucent material, the tube extending longitudinally along a tube site and having a lower section defining a water course, and
   a cover extending externally over the tube and being air supported, said cover being at least partially spaced from the tube and providing an insulating space for insulating at least a substantial part of the tube.
2. Apparatus as claimed in claim 1 wherein the tube is air supported.
3. Apparatus as claimed in claim 2 including inflation means for at least one of inflating the tube and for maintaining the tube inflated.
4. Apparatus as claimed in claim 3 wherein the inflation means is an air handling means.
5. Apparatus as claimed in claim 4 wherein the air handling means is a fan.
6. Apparatus as claimed in claim 4 wherein the air handling means is a compressor.
7. Apparatus as claimed in claim 4 wherein the air handling means comprises a wind directing system for directing wind into the tube to inflate the tube and/or to maintain the tube inflated.
8. Apparatus as claimed in claim 1 wherein at least the lower section of the tube is closed at both ends to form an enclosure for water.
9. Apparatus as claimed in claim 1 including retaining means for at least one of retaining the tube and the contents thereof in a desired position on a site.
10. Apparatus as claimed in claim 9 wherein the retaining means extends longitudinally of the tube.
11. Apparatus as claimed in claim 9 wherein the retaining means extends externally of the tube.
12. Apparatus as claimed in claim 9 wherein the retaining means is a mound.
13. Apparatus as claimed in claim 9 wherein the retaining means engages the tube.
14. Apparatus as claimed in claim 1 comprising a number of tubes.
15. Apparatus as claimed in claim 14 wherein the tubes are arranged substantially parallel in generally side by side relation.
16. Apparatus as claimed in claim 14 including fluid connection means between at lease some of the tubes.
17. Apparatus as claimed in claim 16 wherein the fluid connection means comprises a water-carrying channel means.
18. Apparatus as claimed in claim 17 wherein the water flow control means includes a weir means.
19. Apparatus as claimed in claim 16 including water flow control means between the tubes.
20. Apparatus as claimed in claim 14 wherein there are two tubes.
21. Apparatus as claimed in claim 1 wherein the tube is of plastics material.
22. Apparatus as claimed in claim 21 wherein the tube is of polyvinylchloride or polyethylene material.
23. Apparatus as claimed in claim 21 wherein the tube material is at least 100 microns thick.
24. Apparatus as claimed in claim 23 where the tube material is approximately 200 microns thick.
25. Apparatus as claimed in claim 1 wherein the tube comprises a number of layers.
26. Apparatus as claimed in claim 1 wherein the tube, in the expanded configuration has a diameter of at least 5 m.
27. Apparatus as claimed in claim 1 wherein the tube has a diameter of at least 6 m.
28. Apparatus as claimed in claim 1 wherein the tube is at least 50 m long.
29. Apparatus as claimed in claim 28 wherein the tube is at least 100 m long.
30. Apparatus as claimed in claim 29 including access means for access to the tube.
31. Apparatus as claimed in claim 30 wherein the access means comprises an access door.
32. Apparatus as claimed in claim 30 wherein the access means includes an air lock.
33. Apparatus as claimed in claim 30 wherein the access means is provided at one end of the tube.
34. Apparatus as claimed in claim 1 wherein the cover is translucent.
35. Apparatus as claimed in claim 1 wherein the cover is of similar material to that of the tube.
36. Apparatus as claimed in claim 1 including cover retaining means for retaining the cover in position over the tube.
37. Apparatus as claimed in claim 36 wherein the cover retaining means extends longitudinally of the cover and tube.
38. Apparatus as claimed in claim 36 wherein the cover retaining means extends transversely of the cover and the tube.
39. Apparatus as claimed in claim 36 wherein the cover retaining means comprises a mound.
40. Apparatus as claimed in claim 1 which forms a digester module.
41. Apparatus as claimed in claim 1 which forms an algae module.
42. Apparatus as claimed in claim 1 which forms a zooplankton module.
43. Apparatus as claimed in claim 1 which forms a higher order aquatic plants module.
44. Apparatus as claimed in claim 1 which forms a dry matter consuming module.
45. Apparatus as claimed in claim 1 which forms a fish rearing module.
46. Apparatus as claimed in claim 1 which is adapted for rearing fish.
47. Apparatus as claimed in claim 1 which is adapted for growing aquatic plants.
48. Apparatus as claimed in claims 1 which is adapted for growing fish food.
49. Apparatus as claimed in claim 1 which is adapted for treating waste.
50. Apparatus as claimed in claim 1 which is adapted for water treatment.
51. An aquaculture system comprising a number of tubes as defined in claim 1, the tubes defining at least some of the modules of an integrated system.
52. An aquaculture system as claimed in claim 51 comprising:
   an aerobic digester for digesting waste and producing biomass;
   a primary algae treatment section for treating the biomass from the aerobic digester;

a zooplankton module for consuming the algae treated biomass and generating zooplankton and water;

an algae module for treating the water from the zooplankton module; and a dry matter content consuming section for consuming at least some of the zooplankton harvested from the zooplankton module.

53. An aquaculture system as claimed in claim 52 wherein the aerobic digester and primary algae treatment section are provided in the same module.

54. An aquaculture system as claimed in claim 52 wherein the dry matter content consuming section is a fish rearing module.

55. An aquaculture system as claimed in claim 54 wherein waste generated in the fish rearing module is digested in the aerobic digester.

56. Aquaculture apparatus comprising a plurality of tubes as defined in claim 1, the tubes defining at least some of the modules of a fish rearing system.

57. Apparatus as claimed in claim 56 comprising:

a fish rearing module;

a digester module for treating by-products from the fish rearing module;

a zooplankton module for consuming biomass produced by the digester, the zooplankton module producing zooplankton and water; and an algae production module.

58. Apparatus as claimed in claim 57 wherein the zooplankton module produces carnivorous zooplankton.

59. An aquaculture system as claimed in claim 58 wherein at least some of the modules are defined by an elongate tube of flexible translucent material, the tube extending longitudinally along a tube site and having a lower section defining a water course.

60. An aquaculture system as claimed in claim 58 wherein carnivorous zooplankton from the carnivorous zooplankton module provide food which is fed to the fish in the fish rearing module.

61. Apparatus as claimed in claim 57 including:

a herbivorous zooplankton module for consuming algae produced in the algae production unit; and a higher order plant module for consuming waste produced by the herbivorous zooplankton module.

62. An aquaculture system as claimed in claim 61 wherein herbivorous zooplankton from the herbivorous zooplankton module provide food which is fed to fish in the fish rearing module.

63. An aquaculture system as claimed in claim 61 wherein higher order plants produced in the higher order plant module provide food which is fed to fish in the fish rearing module.

64. An aquaculture system as claimed in claim 61 wherein purified water produced in the higher order plant module provides a water supply to the fish rearing module.

65. Aquaculture apparatus comprising at least one tube of flexible translucent material, the tube extending longitudinally along a tube site and having a lower section defining a water course, the tube being of a material which is supported with gas inflation on level ground while avoiding the necessity for external retaining structure, and a cover extending externally over the tube, the cover being air supported and being spaced, at least partially, from the tube to provide an insulating space between the tube and the cover for insulating at least a substantial part of the tube.

66. Apparatus as claimed in claim 65, comprising a plurality of tubes arranged side by side.

67. Apparatus as claimed in claim 65, wherein there are a plurality of tubes arranged side by side and the cover extends externally over all of the tubes, and a retaining means is applied over side edges of the cover.

* * * * *